H. WILCOX.
FRONT AND REAR DRIVEN MOTOR VEHICLE.
APPLICATION FILED JUNE 1, 1918.
1,308,314.
Patented July 1, 1919.
5 SHEETS—SHEET 1.
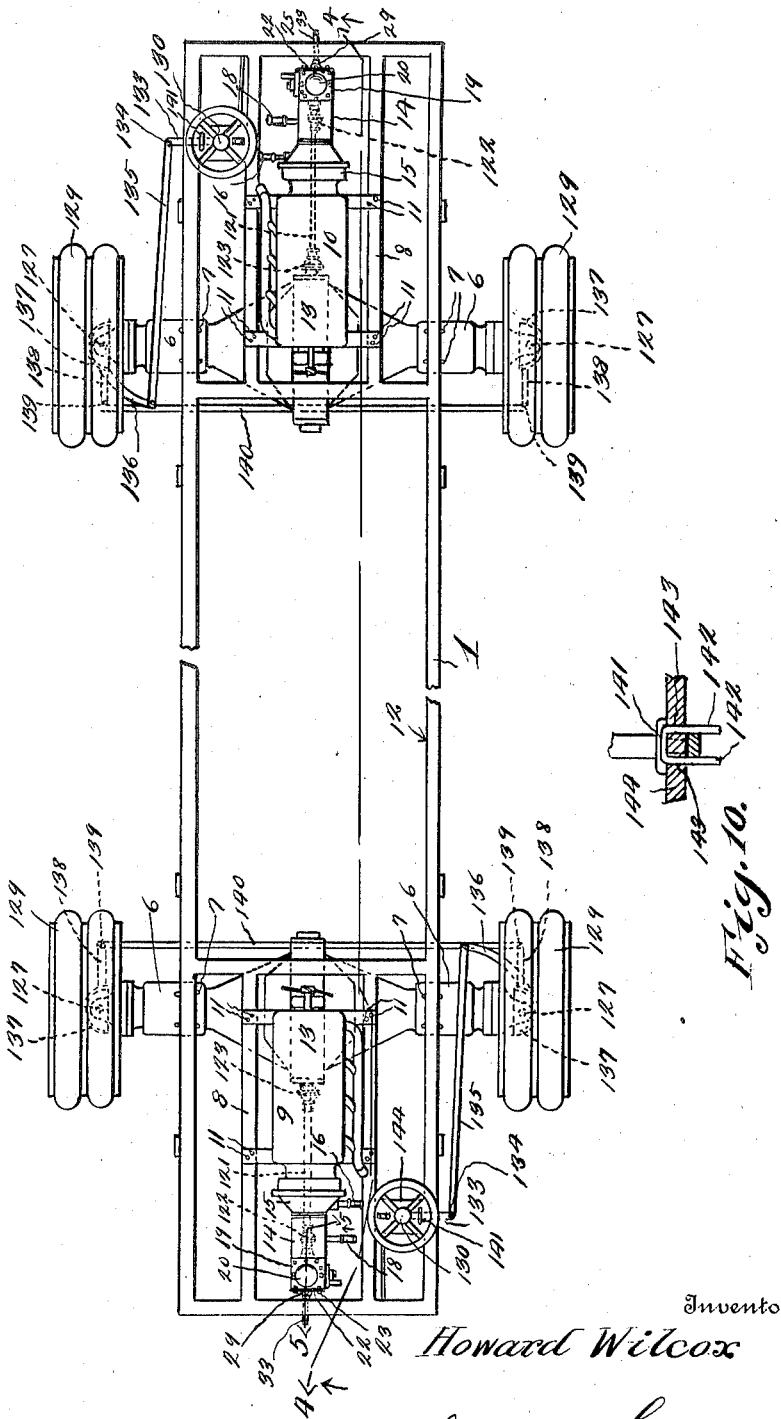
Inventor
Howard Wilcox
By Philip A. H. Ferrell
his Attorney

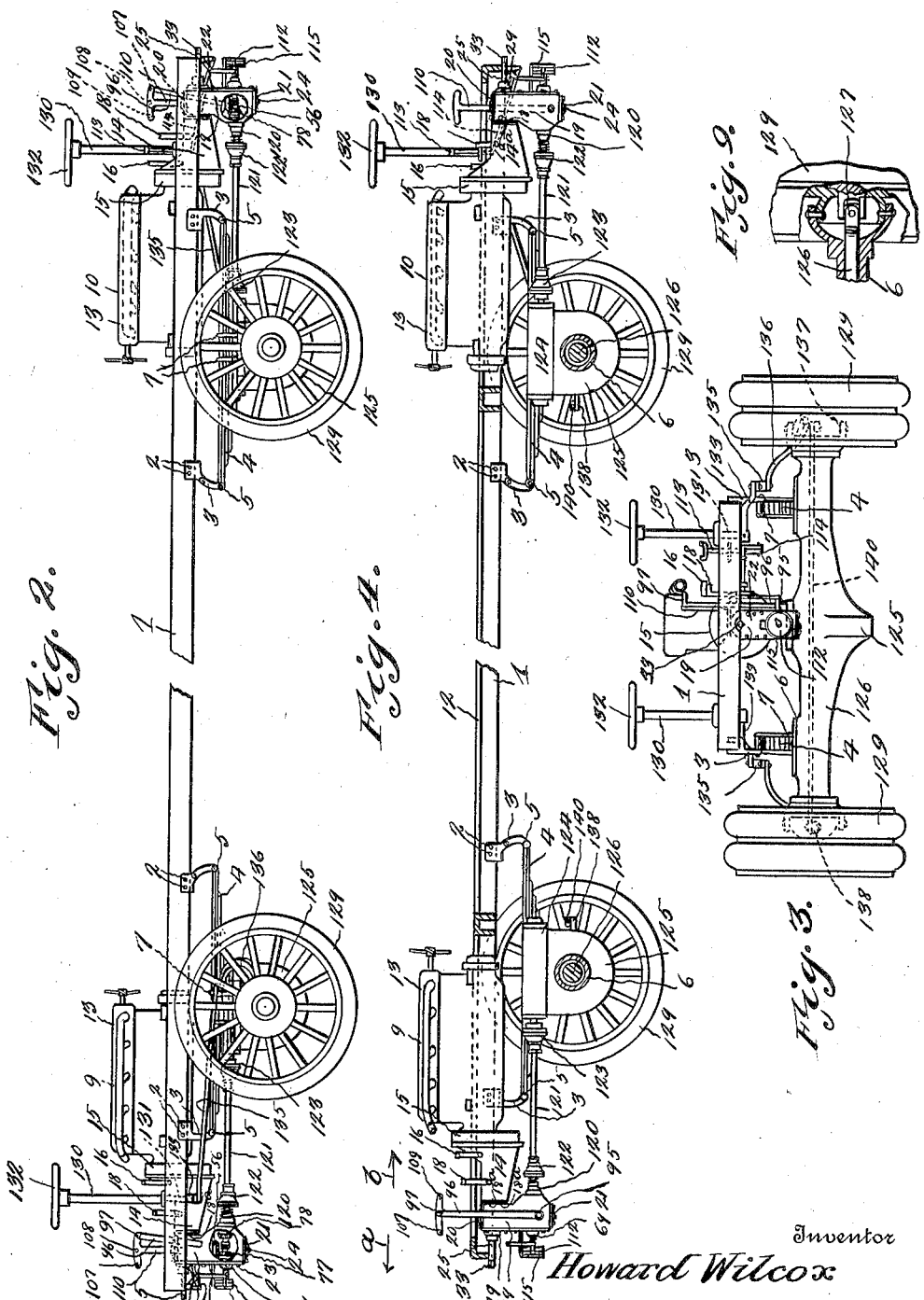

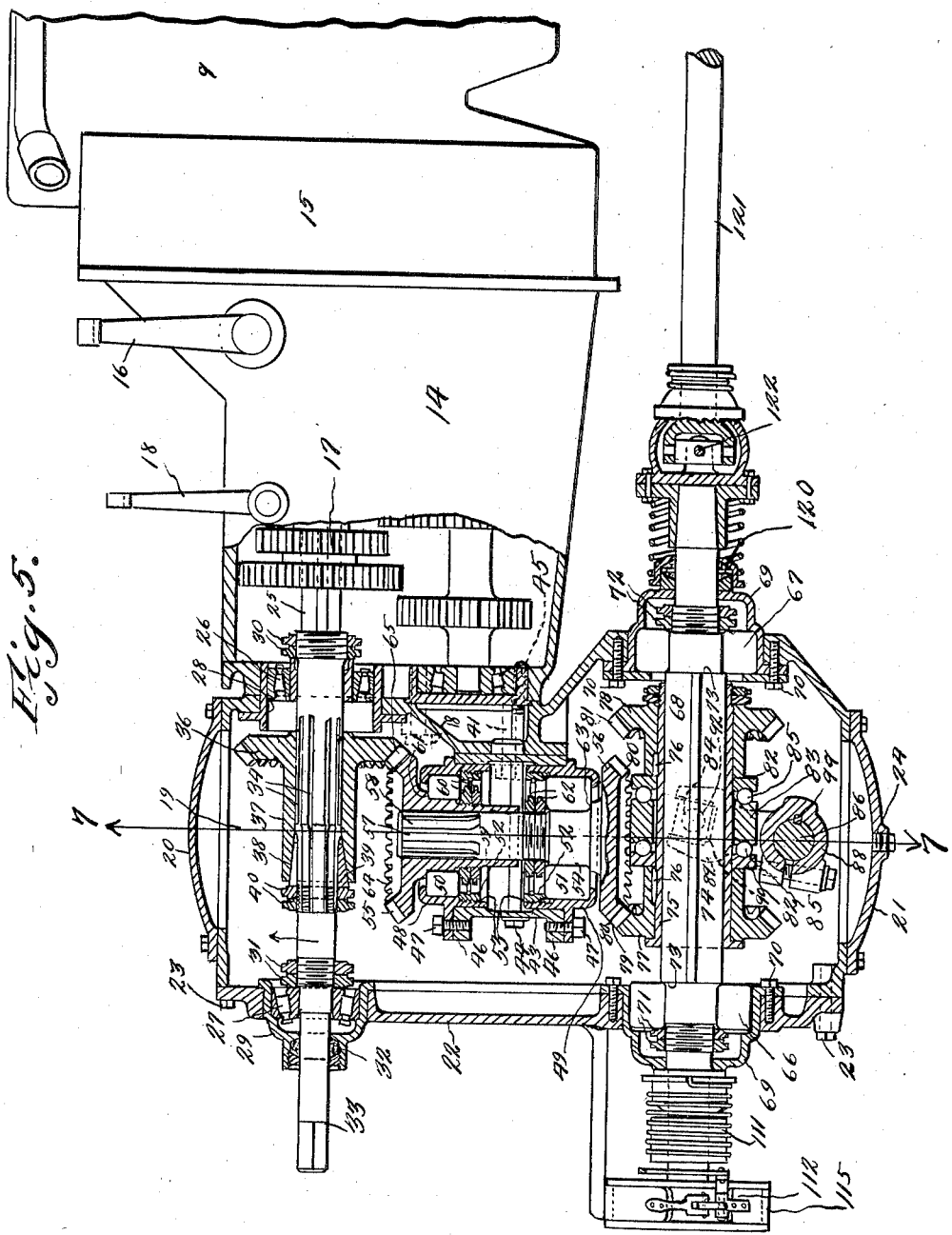

H. WILCOX.
FRONT AND REAR DRIVEN MOTOR VEHICLE.
APPLICATION FILED JUNE 1, 1918.
1,308,314.
Patented July 1, 1919.
5 SHEETS—SHEET 5.
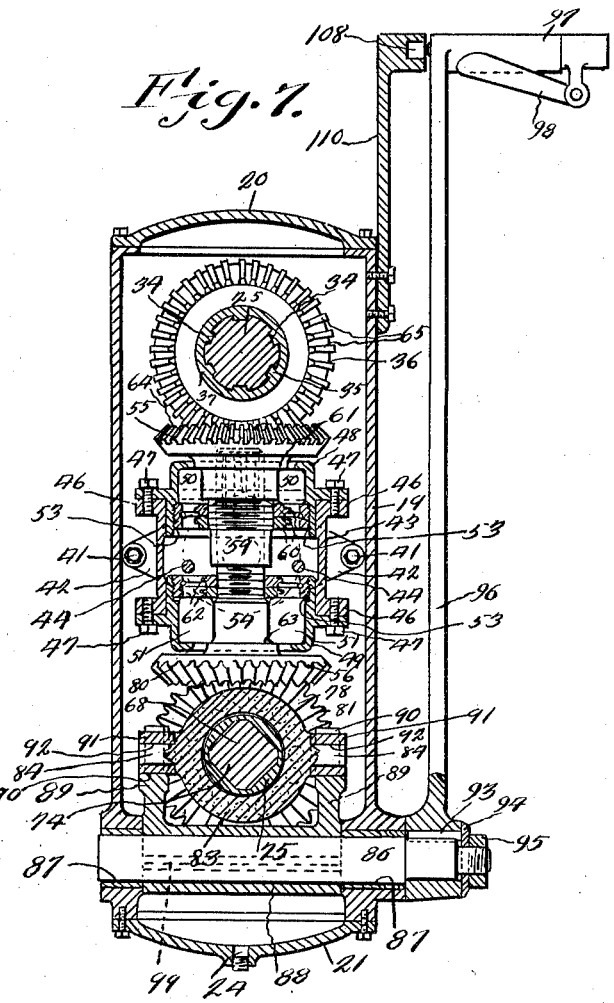
Fig. 7.
Fig. 8.
Inventor
Howard Wilcox
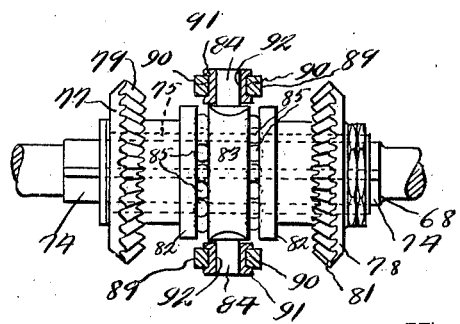
Attorney

UNITED STATES PATENT OFFICE.

HOWARD WILCOX, OF WASHINGTON, DISTRICT OF COLUMBIA.

FRONT AND REAR DRIVEN MOTOR-VEHICLE.

1,308,314.  Specification of Letters Patent.  Patented July 1, 1919.

Application filed June 1, 1918.  Serial No. 237,737.

*To all whom it may concern:*

Be it known that I, HOWARD WILCOX, a citizen of the United States of America, residing at the Bellevue Hotel, Washington, District of Columbia, have invented certain new and useful Improvements in Front and Rear Driven Motor-Vehicles, of which the following is a specification, reference being had therein to the accompanying drawing.

The object of the invention is to construct a motor driven vehicle so that a bottom dump body may be easily and quickly applied thereto and also so constructed as to allow the contents of the body to be dumped downwardly between the axles, eliminating the complicated structures now in use and mechanisms commonly disposed between the axles, such for instance as driving shafts, transmissions, clutches, etc. Also eliminating the necessity of tilting the vehicle body rearwardly or to the sides for dumping.

A further object is to provide a vehicle free from central mechanism, therefore allowing the use of a low central body for transporting stone, projectiles and other heavy objects.

A further object of the invention is to provide a motor driven vehicle, having front and rear driven axles, the axles being driven by independent engines located forwardly and rearwardly of the axles.

A further object is to provide a double ended motor driven vehicle, constructed so that the same may be driven in either direction without turning the vehicle around, the advantage in this being that if the vehicle is run into a narrow alley or street, where there is not sufficient room to turn around, the vehicle may be run out of said alley or street without the necessity of turning the vehicle around, which often causes damage to the vehicle and consequent loss of time. To accomplish this it is only necessary for the operator to lock the steering mechanism at one end of the vehicle, start the engine and steer from the other end of the vehicle, using the steering mechanism at that end.

A further object is to provide a motor driven vehicle, having independent engines operating the two wheel driving shafts and flexible axles thereof, so that when either pair of wheels are mired, the engine at the other end of the vehicle will force the mired wheels out of the mire or hole in which they have become stalled.

A further object of the invention is to provide a motor vehicle, having front and rear driven axles of the flexible type, rotating wheels mounted on and adapted to rotate with the flexible axles, engines driving their respective axles and located forwardly and rearwardly of said axles, thereby providing a structure wherein the weight is equally distributed so that the vehicle will be prevented from undue skidding, which is a common danger in the present construction of motor vehicles, wherein the engine is located at one end of the vehicle only.

A further object of the invention is to provide a double ended vehicle, having engines driving its axles according to the direction in which the vehicle is being driven and steering mechanisms located at each end of the vehicle, the steering mechanism at each end of the vehicle being so constructed that it can be easily and quickly locked, or if so desired, when an extremely short turn is being made, the vehicle may be additionally steered from the rear of the vehicle, that is from the opposite end to the direction in which the vehicle is moving.

A further object of the invention is to locate the engines substantially forwardly and rearwardly of the axles, the engines having their shafts extending in opposite directions to each other and operating through a clutch and transmission, the transmission shaft being provided with means for operating a vertical shaft, which rotates whenever the transmission shaft is operated. One end of the vertical shafts having gear means to be engaged by sliding gears mounted on the drive shaft, which actuates the differential through which the wheels are rotated.

Other objects will appear and be better understood from the embodiment of the invention of which the following is a specification reference being had to the accompanying drawings forming a part thereof, in which:

Figure 1 is a top plan view of the vehicle, showing the engines located at the rear ends thereof.

Fig. 2 is a side elevation of the vehicle.

Fig. 3 is an end elevation of the vehicle.

Fig. 4 is a longitudinal sectional view through the vehicle on line 4—4 of Fig. 1.

Fig. 5 is a sectional view through the power transmission mechanism, taken on line 5—5 of Fig. 1.

Fig. 7 is a sectional view through the power casing and mechanism taken on line 7—7 of Fig. 5.

Fig. 8 is a sectional horizontal view on line 8—8 of Fig. 6.

Fig. 9 is a detail of one of the flexible axles.

Fig. 10 is a detail view of the locking means for locking the steering mechanism.

Figure 6:
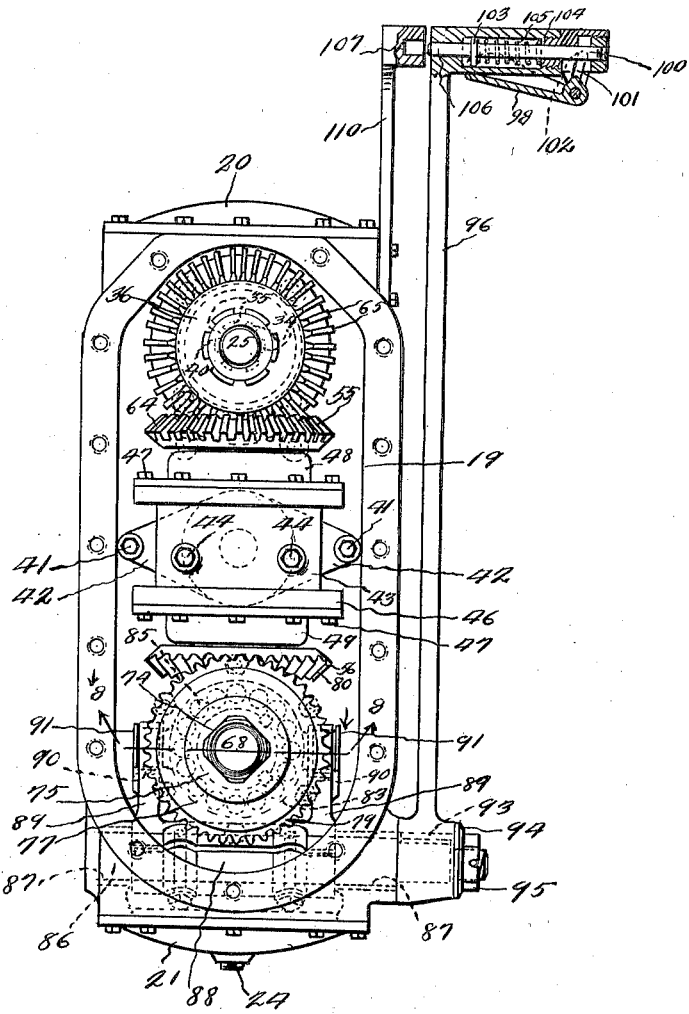
Fig. 6 is an end view of the mechanism in the power transmission casing, the face plate being removed to better show the mechanism.

Referring to the drawings, the numeral 1 designates a frame and secured to the frame on each side thereof as at 2 are downwardly extending brackets 3, to which the ends of the springs 4 are attached as at 5. The springs 4 are in turn secured to the axle casing 6 by means of the U bolts 7, thereby resiliently supporting the frame from the axles of the vehicle. Each end of the frame is provided with an engine foundation 8, to which engines 9 and 10 are secured as at 11. The engines are disposed between the axles of the vehicle and the ends thereof so that there will be a free space between the engines, thereby providing a vehicle free of mechanism in its central portion 12 for the reception of any type of bottom dump body. The engines 9 and 10 have their cylinder portions 13 substantially adjacent a vertical center line of the axles, but forward of the same and their transmission ends 14 extending toward the ends of the vehicle. From this it will be seen that the engines are in opposed or reversed positions to each other. Each engine 9 and 10 is provided with the usual clutch mechanism, not shown, but carried in the casing 15 and controlled by means of the foot lever 16. Each engine is also provided with a transmission mechanism 17 which is mounted in the transmission casings of the engines 9 and 10 and are under the control of the operator by means of the levers 18. The type of engines to be used and the particular construction of the clutch mechanism and transmission may be of any type or construction and may vary according to the size of vehicle desired.

Both ends of the vehicle are alike and the mechanism of the same construction, therefore the power transmission mechanism of one end of the vehicle will be described and the numerals will apply to the mechanism located at the other end.

Secured to the transmission casing 14 of the engine by means of the bolts 18ª is a casing 19, which is provided with top and bottom removable plates 20 and 21 bolted thereto so that the mechanism contained in the casing 19 may be easily reached for repairing, cleaning or assembling. The casing 19 is also provided with a face plate 22 which is secured to the casing by means of the bolts 23. The bottom plate 21 is provided with an opening 24, for draining the casing of oil when it is desired to remove the oil therefrom. The transmission driving shaft 25, extends through the upper end of the casing and is supported in anti-frictional bearings 26 and 27, which are carried by the bearing gages 28, said anti-frictional bearings being held in the cages 28 and 29 by means of the locked nuts 30 and 31, which retain the anti-frictional bearings in the bearing cages. The cage 29 is provided with a packing gland 32, through which the reduced cranking end 33 of the shaft 25 extends. The shaft 25 is provided with a series of longitudinal slots 34, which receive the lugs 35 of the bevel gear 36. The sleeve portion 37 of the gear 36 is provided with a tapering opening 38. A split tapering sleeve 39 is forced into the tapering opening 38 of the sleeve of the bevel gear, thereby preventing longitudinal movement of the gear 36 on the shaft 25 and is prevented from longitudinal movement on the shaft 25 by means of locked nuts 40. Secured to the transmission casing 14 by means of the bolts 41, which pass through apertures in the arms 42 is a cylindrical casing 43. This casing is additionally secured to the transmission casing by means of the bolts 44 which thread into the transmission casing as at 45. The cylindrical casing is provided with flanges 46 and secured to the flanges 46, of the casing 43 by means of the bolts 47 are anti-frictional bearing cages 48 and 49, which are provided with anti-frictional bearings 50 and 51 which are held in said cages by retaining rings 52 threaded into the cages as at 53. Mounted in the bearings 50 and 51 and supported thereby is a vertical shaft having bevel gears 55 and 56. The gear 56 is integral with the shaft 54, while the gear 55 is rigidly secured to the end 57 of the shaft by means of the vertical slots 58, which engage corresponding lugs on the sleeve portion 59 of the gear 55. Locking nuts 60 are threaded upon the sleeve 59, thereby preventing displacement of the anti-frictional bearings 50 which engage the shoulder 61 of the gear 55. Locking nuts 62 are threaded upon the shaft 54 and engage the bearings 51, thereby preventing displacement of the bearings from engagement with the shoulder 63 of the gear 56. From the above it will be seen, that the shaft 54 is supported in anti-frictional bearings insuring the best of running condition and at the same time, preventing and reducing the friction between the rotatable parts to a minimum. The teeth 64 of the gear 55 are in mesh with the teeth 65 of the gear 36, therefore when a revoluble movement is imparted to the transmission shaft 25, the shaft 54 will be caused to rotate and also the gears 55 and 56 which are rigidly secured thereto and therefore will rotate therewith.

Rotatably mounted in anti-frictional bearings 66 and 67 located at the lower end of the casing 19 is a horizontal shaft 68. The bearings are carried by the bearing cages 69, which are secured to the casing 19 by means of the bolts 70. Locking nuts 71 and 72 are threaded upon the shaft and prevent displacement of the anti-frictional bearings in relation to the shoulders 73, of the shaft 68. The portion of the shaft 68 designated by the numeral 74 is substantially square in cross section and slidably mounted upon the portion 74 is a sleeve 75, which is adapted to rotate with, but slidably move upon the section 74 of the shaft 68. Keyed to the slidable sleeve 75 by means of the keys 76 are bevel gears 77 and 78. Gear 77 is the forward gear while gear 78 the reverse gear. When the teeth 79 of the forward gear 77 are in mesh with the teeth 80, of the gear 56, the vehicle will be propelled in the direction of the arrow $a$. While when the teeth 81 of the gear 78 are in mesh with the teeth 80 of the gear 56 the vehicle will be propelled in the direction of the arrow $b$. Anti-frictional bearing plates 82 are mounted upon the slidable sleeves 75 and disposed between the sleeves of the bevel gears 77 and 78. An anti-frictional bearing sleeve 83 is mounted upon the slidable sleeve 75 and is provided with lugs at diametrically opposite sides thereof. Anti-frictional bearings 85 are disposed between the bearing plates 82 and the sides of the sleeve 83 thereby reducing the friction when the gears are rotated and the sleeve 83 remaining stationary.

A rock shaft 86 is transversely disposed and rockably mounted in bearings 87 at the lower end of the casing 19. This shaft is at right angles to the shaft 68. Secured by means of the key 99 to the shaft 86 is a sleeve 88, which is adapted to be rocked with the shaft 86. This sleeve 88 is provided with upstanding arms 89, having bifurcations 90, in which slidable blocks 91 are slidably mounted. These blocks 91 are provided with apertures 92, which receive the lugs 84 at diametrically opposite sides of the sleeve 83. Keyed as at 93 and additionally secured by means of the washer 94 and nut 95 is the forward and reverse operating lever 96. This lever is provided with a handle 97 and hand grip 98. Slidably mounted in the handle 97 is a detent pin 100. The arm 101 of the hand grip 98 engages an aperture 102, in the pin 100 so that the pin 100 can be oscillated by means of the grip 98. The detent pin 100 is provided with an annular flange 103 and between this flange and the shoulder 104 a coiled spring is disposed for normally maintaining the nose 106 of the detent pin 100 in engagement with any of the apertures 107, 108 or 109 of the bracket 110. One end of the shaft 68 is provided with a spring actuated packing box 111 and also with a brake 112, which is actuated by means of the lever 113, rod 114 and brake band 115. The other end of the shaft 68 is provided with a spring actuated packing box 120 to prevent leakage of oil which may fill the casing 19. One end of the driving shaft 121 is connected to the shaft 68 by means of a universal joint 122, its other end being connected to the differential driving mechanism by means of the universal joint 123. The differential driving mechanism and differential are of any construction and are not shown, but they are carried in the casings 124 and 125. The axles 126 are of the usual flexible type and are provided with universal joints 127 and rotate the wheels 129 of the vehicle.

It will be seen, that when the transmission shaft 25 is rotated, the shaft 54 will also rotate as the bevel gears 36 and 55 are in mesh. The gear 56 being integral with the shaft will also rotate, the speed of rotation being governed by the speed of the transmission mechanism. When it is desired to move the vehicle in the direction of the arrow $a$, the lever 96 is moved so that the pin 106 will engage the aperture 109, thereby sliding the sleeve 74 and the gears 77 and 78. The teeth 79, of the gear 77 will mesh with the teeth 80 of the gears 56, thereby imparting revoluble movement to the shaft 68, which will revolve the driving shaft 121, the differential driving mechanism and differential, which in turn will revolve the axle 126 and consequently the wheels 129. From the foregoing it will be seen that power will be transmitted to the wheels, and that said power will be under a variable control of the operator of the vehicle. When it is desired to run the vehicle in the opposite direction the lever 96 is moved until the end 106 of the detent pin 100 engages the aperture 107. When so placed the teeth 81 of the reverse gear 78 will engage the teeth 80 of the gear 56, which will revolve the shaft 68 and driving shaft 121, in the opposite direction. It will be noted that when the vehicle is going in one direction the forward gear 77 is in engagement with the gear 56 at the end in the direction in which the vehicle is going, while the reverse gear 78 is in engagement with the gear 56 at the other end of the vehicle.

For instance, while the engines are going full speed one of the axles would be revolving full speed in forward gear, while the other would be revolving full speed in reverse gear.

Steering mechanism.

A double steering mechanism is provided one at each end of the vehicle and are adapted to be operated by operators located at each end of the vehicle. Each of these steering mechanisms are of the same construction, but are provided with means whereby when it is desired to use the vehicle as a two wheel steered vehicle instead of a four wheel one, one of the mechanisms may be locked and the vehicle steered from one end only.

The steering mechanisms comprise steering posts 130 which are rotatably mounted in bearings 131 and are provided with steering wheels 132. Secured to the lower ends of the steering posts are arms 133 and pivotally connected to the arms 133 as at 134, are links 135, which are in turn connected to the arms 136 of the wheel turning knuckles 137. The wheel turning knuckles 137 are provided with arms 138 and pivotally secured as at 139 to said arms are connecting rods 140 by means of which the wheels will be moved in unison when the steering wheels are turned in one direction or the other. When it is desired to lock one of the steering mechanisms a U-shaped bolt 141, having arms 142, may be passed through the apertures of a portion 144 of the frame. From this it will be seen that the mechanism at either end of the vehicle may be locked, and also that both mechanisms may be used at the same time thereby providing a vehicle which can be steered with two or four wheels.

The invention having been set forth what is claimed as new and useful is:—

1. A motor driven vehicle having axles adjacent its ends, an engine and steering mechanism located at each end of said vehicle and located between each end of the vehicle and the axle adjacent thereto, said engines driving their adjacent axles.

2. A motor driven vehicle having engines located at the ends of said vehicle, said engines being located forwardly and rearwardly of the axles of the vehicle and adapted to be operated for operating their respective axles according to the direction in which the vehicle is going, steering mechanisms located at each end of the vehicle and means for locking either steering mechanism as desired.

3. A motor driven vehicle having engines at opposite ends of said vehicle, said engines being located substantially forwardly and rearwardly of the axles of the vehicle and in opposed positions, a transmission mechanism carried by the engine, means for operating the transmission mechanism as desired, said transmission operating a shaft which terminates in a near position to a forward and reverse mechanism, said forward and reverse mechanisms being adapted to engage a gear on the shaft when it is desired to move the vehicle forwardly or rearwardly and means whereby power will be transmitted from the forward and reverse mechanism to the axle.

4. A driving mechanism for motor vehicles comprising an engine located forwardly of the front axle or rearwardly of the rear axle, a transmission mechanism in connection with said engine, means for operating the transmission mechanism as desired, said transmission operating a shaft which terminates in a near position to a forward and reverse mechanism, said forward and reverse mechanism being adapted to engage a gear on the shaft when it is desired to move the vehicle forwardly or rearwardly and means whereby power will be transmitted from the forward and reverse mechanism to the axle.

5. A motor driven vehicle having engines at opposite ends of said vehicles, said engines being located substantially forwardly and rearwardly of the axles of the vehicle and extending in opposed positions, a transmission mechanism in connection with said engines, means for operating the transmission mechanism as desired, said transmission having a gear on its shaft engaging a gear on a vertical shaft thereby rotating the same when the engine is started and the transmission in operation, a gear on the lower end of said shaft and disposed between gears slidably mounted upon the shaft and adapted to rotate with the shaft, a driving shaft connected to one end of the forward and reverse shaft, the other end of the driving shaft operating the differential of the axle thereby rotating the same and the wheels thereon and means for throwing the forward and reverse gears into and out of mesh.

6. A driving mechanism for motor vehicles comprising an angine located forwardly of the front axle or rearwardly of the rear axle, a transmission mechanism in connection with said engine, means for operating the transmission mechanism as desired, said transmission having a gear on its shaft engaging a gear on a vertical shaft thereby rotating the same when the engine is operated and the transmission is in operation, a gear on the lower end of said vertical shaft and disposed between slidable gears mounted upon a shaft in a forward and reverse casing and adapted to rotate said shaft, said shaft being in parallelism and in vertical alinement with the transmission shaft and also in horizontal alinement with the axle, a driving shaft having universal connection between the forward and reverse shaft and the differential, rotatable shafts rotated by the differential and wheels rotated by said shafts.

7. A motor driven vehicle having engines at its ends, shafts extending in opposite horizontal directions, vertically downwardly extending shafts being driven by the first named shafts and transmitting power to horizontal driving shafts which in turn drive the axles of the vehicle.

8. A motor driven vehicle having engines located at the ends of said vehicle, said engines extending in opposed directions, the engine driving shafts extending in opposed horizontal directions and having means for rotating vertical shafts, said vertical shafts being adapted to drive driving shafts extending toward the center of the vehicle and rotating the axles thereof.

9. A motor driven vehicle having engines located at the ends of said vehicle, said engines being located substantially forwardly and rearwardly of the axles allowing use of a low body structure, said engines being provided with forward and reverse mechanism so constructed and arranged that when the vehicle is driven in one direction the engine on the end in the direction the vehicle is driven will be in forward gear while the engine on the other end of the vehicle will be in reverse gear and means whereby the forward and reverse gearing of the engines may be changed.

10. A driving mechanism for motor vehicles comprising an engine located forwardly of the front axle and rearwardly of the rear axle, allowing use of a low body structure transmission and clutch mechanisms in connection with said engines, means for operating the transmission and clutch mechanisms as desired, said transmissions operating shafts supported and rotatable in anti-frictional bearings and terminating in juxtaposition to forward and reverse mechanisms which are adapted to engage gears on the shafts when it is desired to move the vehicle forwardly or rearwardly and means whereby power will be transmitted from the forward and reverse mechanisms to the axle.

11. A motor driven vehicle having engines at opposite ends of said vehicle, said engines being located substantially forwardly and rearwardly of the axles of the vehicle and extended in opposite directions, a transmission in connection with said engines, means for operating the transmission mechanisms as desired, said transmissions having gears on their shafts engaging gears on vertical shafts thereby rotating the same when the engines are started and the transmission in operation, gears on the lower ends of said shafts and located between forward and reverse gears slidably mounted upon shafts and adapted to rotate with the shafts, brake mechanisms carried by the forward and reverse shafts, driving shafts connected to one end of the forward and reverse shafts and adapted to be rotated thereby, the other end of the driving shafts operating the differentials of the axes thereby rotating the axles and the wheels thereon and means for throwing the forward and reverse gears into and out of engagement with the gears on the ends of the vertical shafts.

12. A motor driven vehicle having engines at opposite ends of said vehicle, said engines being located substantially forwardly and rearwardly of the axles of the vehicle and extended in opposed directions, a transmission in connection with said engines, means for operating the transmission mechanisms as desired, said transmission having gears on their shafts engaging gears on vertical shafts thereby rotating the same when the engines are started and the transmission is in operation, gears on the lower ends of said shafts and located between forward and reverse gears slidably mounted upon shafts and adapted to rotate with the shafts, brake mechanisms mounted upon the forward and reverse shafts for braking the same when desired, driving shafts connected to the forward and reverse shafts for rotating the axles and means for shifting the forward and reverse gears into and out of gear.

13. A motor driven vehicle having engines located at the ends thereof and substantially forwardly and rearwardly of the axles of the vehicle and driving wheels at their respective ends of the vehicle and steering mechanisms at the ends of the vehicle located forwardly and rearwardly of the axles, said location of the engines and steering mechanisms allowing use of a low body structure and providing a clear space between the axles free from driving or steering mechanism.

14. A motor driven vehicle having engines located at the ends of said vehicle, steering mechanisms located at the ends of said vehicle, said engines being adapted to operate their respective axles, said engines and steering mechanisms being located substantially forward and rearwardly of the axles of the vehicle allowing use of a low body structure and means whereby either steering mechanism may be locked as desired.

15. A motor driven vehicle having engines located forwardly and rearwardly of its axles allowing use of a low body structure, said engines having forward and reverse mechanisms in connection therewith so constructed that the vehicle may be driven in either direction, one engine being in reverse gear, while the other is in forward gear.

16. A motor driven vehicle having engines located forward and rearwardly of its axles allowing use of a low body structure and so arranged that the power is carried by shafts toward adjacent ends of said vehicle, thence downwardly by shafts and thence toward the center of the vehicle to its axles by driving shafts.

17. A motor driven vehicle having engines located at its opposite ends forwardly and rearwardly of its axles allowing use of a low body structure, said engines being so arranged that the power will be carried by shafts toward adjacent ends of said vehicle, thence downwardly by shafts, thence to the axles through driving shafts in horizontal alinement with the axles.

In testimony whereof I hereunto affix my signature.

HOWARD WILCOX.